United States Patent
Delort

(10) Patent No.: US 7,651,052 B2
(45) Date of Patent: Jan. 26, 2010

(54) DEVICE FOR SUPPLYING ELECTRICITY AND AIR TO AN AIRPLANE ON THE GROUND

(75) Inventor: M. Pierre Delort, Tournefeuille (FR)

(73) Assignee: Airbus France, Toulouse (FR)

( * ) Notice: Subject to any disclaimer, the term of this patent is extended or adjusted under 35 U.S.C. 154(b) by 302 days.

(21) Appl. No.: 11/672,998

(22) Filed: Feb. 9, 2007

(65) Prior Publication Data

US 2007/0235587 A1    Oct. 11, 2007

(51) Int. Cl.
*B64D 41/00* (2006.01)

(52) U.S. Cl. .......................... 244/58; 244/1 R; 62/129; 62/239; 62/440

(58) Field of Classification Search .................. 244/58, 244/1 R, 129.1; 62/129, 161, 239, 440
See application file for complete search history.

(56) References Cited

U.S. PATENT DOCUMENTS 5,309,029 A * 5/1994 Gregory et al. ............. 290/1 R
7,322,203 B2 * 1/2008 Widegren ...................... 62/97
2007/0089411 A1 * 4/2007 Leistner et al. ............... 60/599
2007/0209383 A1 * 9/2007 Hutton ......................... 62/434

FOREIGN PATENT DOCUMENTS

DE           296 22 089 U1    5/1998

* cited by examiner

*Primary Examiner*—J. Woodrow Eldred
(74) *Attorney, Agent, or Firm*—Perman & Green LLP

(57) ABSTRACT

In order to not risk producing an overpressure of air in the cabin of an airplane on the ground during servicing operation on the airplane, it is appropriate to deliver the air into the cabin of the airplane only when the inlets of the air-conditioning system are open. A device for feeding electricity and air to an airplane on the ground includes means of electric production capable of being connected to at least one electric circuit of the airplane and includes means of producing a flow of air. It has, in addition, a means of determining whether the airplane is actually switched on electrically or is not actually switched on electrically and means for inhibiting the flow of air delivered toward the airplane when the airplane is not actually switched on electrically, that is, as long as it is uncertain whether the inlets of the air-conditioning system are opened.

24 Claims, 4 Drawing Sheets

DEVICE FOR SUPPLYING ELECTRICITY AND AIR TO AN AIRPLANE ON THE GROUND

Figure 1:
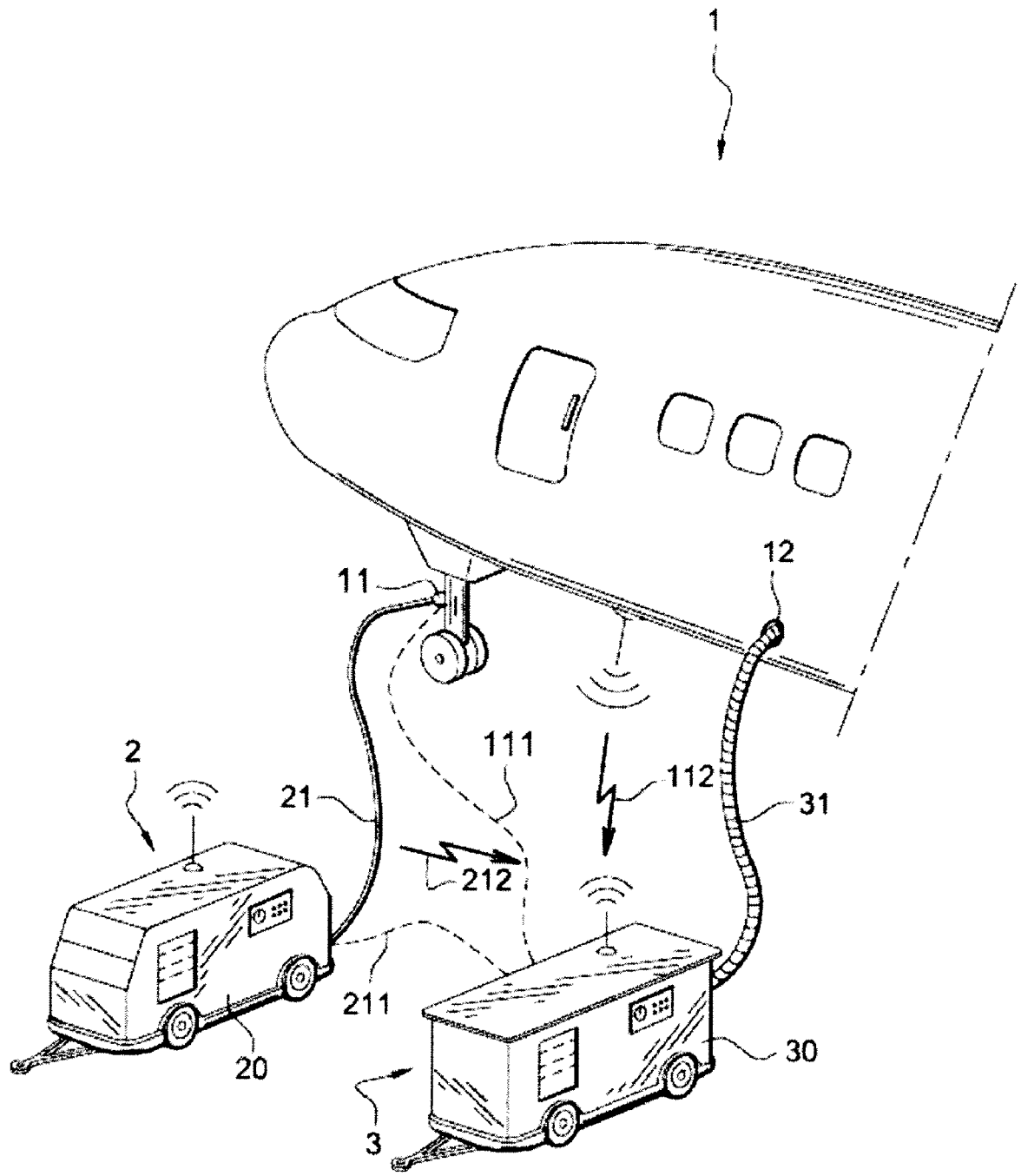

The disclosed embodiments relates to a device for supplying electricity and air to an airplane on the ground that avoids accidentally pressurizing the cabin of the airplane when the air conditioning means connected to the airplane from the ground are operated during the servicing operations on the parked airplane.

When a civil airplane is not used for a certain period of time and no crew personnel or maintenance personnel are in need of sustained access to the airplane cabin, the doors and exits of the airplane are closed, particularly so as to prevent moisture and walking, crawling, or flying animals from entering the cabin.

This closure is complete insofar as not only the doors and exits of the airplane are closed, but also the inlets used for air-conditioning of the airplane, the air-intake inlet and the pressure-regulating outlet on the vents for evacuating cabin air, are in closed positions.

Thus, the air intakes located on the lower side of the airplane are set in a so-called water-landing position, that is, blocked by the watertight flaps for delaying water from entering the airplane in the event of a forced landing on water, and the air-outlet vent(s) used for regulating the pressure of the cabin during flight is (are) positioned so as to completely close the outlet opening.

Prior to returning the airplane to service, it is necessary to carry out security checks as well as routine operations. In order for the maintenance crews on the ground to be able to perform these operations and for the cabin of the airplane to be in conditions of temperature and electric power supply that allow it to admit the crew and passengers, the first action consists in connecting the airplane to the ground means of electric power supply and air conditioning outside of the airplane.

Thus, the airplane is linked to an electric power source on the ground by means of an electrical connector, referred to as a ground service connector, via an electric cable, which establishes the primary supply of electric power when the engines and the auxiliary power units for boarding are shut off, and by means of a pneumatic connector via a tube that is able to have a size of several tens of centimeters in diameter, through which is delivered the conditioned air by a ventilation and air-conditioning unit on the ground, which is often placed in proximity to the airplane.

When the airplane is being serviced and the electrical cable and the air-delivery tube are connected, the personnel in charge of this operation begins by switching on the ground service connector. Once this ground service connector is switched on, one person enters the airplane via one of the exits and literally switches on the airplane by way of a master switch. This action results in opening of the air-conditioning inlets and thus ensures that the cabin of the airplane is at the pressure of the outside air even when the entry doors are closed. In a subsequent step, air is delivered through the tube in order to air-condition the atmosphere in the cabin of the airplane.

This procedure does not raise any particular problem, but, nonetheless, it has been found that the personnel who are in charge of maintenance and who wish to save time in the servicing operations deliver air to the cabin by, for example, starting up the air-conditioning unit on the ground before climbing into the airplane to operate the switches for switching on the airplane. When this procedure is used, the air enters the cabin before the inlets and the outlets are opened to equilibrate the pressure between the interior and the exterior of the cabin. In a few seconds of operation of the ground air-conditioning unit, then, the differential pressure in the interior of the cabin can reach several thousand pascals. On one passenger door of about two square meters, the force exerted by the pressure attains very high levels, 200 DaN for 1000 Pa of differential pressure. Under such conditions, the personnel who unlock the door in order to enter the airplane so as to operate the switch for switching on the airplane may find themselves violently thrown backward by sudden movement of the door subjected to this force.

Fortunately very rare, incidents of this type have been observed, with more or less serious consequences, and they have motivated reminding the ground crews of the safety instructions in the servicing procedure of the airplane.

In order to remedy this problem and to prevent the risk of accidental pressurization of an airplane when it is serviced, the disclosed embodiments propose a device for supplying electricity and air to an airplane on the ground, comprising means of electric production, means of producing a flow of air, and means of allowing or inhibiting the flow of air toward the airplane, depending on whether the airplane is actually switched on electrically or is not actually switched on electrically.

Specific means determine whether the airplane is or is not actually switched on—for example, measurement of a parameter that characterizes the electric power used by the plane. In particular, this measured value of the characteristic parameter of the power used by the airplane is compared to a threshold value of said parameter, which preferably is chosen in an interval defined by a minimum value corresponding to the maximum electrical energy used by the airplane when it is not actually switched on and a maximum value corresponding to the minimum electrical energy used by the airplane when it is actually switched on.

In a particular embodiment, the current strength I between the means of electric production and the airplane on at least one electrical conductor, which establishes the electrical link between the airplane and ground means, is used as the characteristic parameter of the power used by the airplane.

The electric current strength I used as a parameter is measured, for example, by means of a current transformer, such as a current clamp or an electric shunt.

The means for determining whether the airplane is or is not actually switched on generate a state signal S, which has a value characteristic of the fact that the airplane is actually switched on when the airplane is determined to be actually switched on and can be emitted either by the ground means or by the airplane.

In an embodiment in which the state signal S is emitted by the airplane, the characteristic of the fact that the airplane is actually switched on is obtained when the means of connection of the airplane to the ground means are detected as being switched on and a electric-power-supply master switch of the airplane is detected as being in closed position.

In a particular embodiment, the means for allowing or inhibiting the flow of air act on the means of producing the flow of air.

When the means of producing the flow of air comprise an electric drive motor, the electric supply of the motor is blocked when the airplane is not actually switched on.

When these means of producing a flow of air comprise a Thermic drive engine, the supply of the starting electric circuit of said Thermic engine is blocked when the airplane is not actually switched on, so that it is impossible to start the Thermic engine. Advantageously, in an alternative or complementary manner, the electric ignition circuits of said Thermic engine are blocked when the airplane is not actually switched on, such that the Thermic engine is stopped. In an alternative or complementary manner, means are afforded for interrupting the delivery of fuel to the Thermic engine when the airplane is not actually switched on.

In a particular embodiment, the means for inhibiting or allowing the flow of air toward the airplane act on the means of producing the flow of air by way of a clutch, which disconnects the turbine producing the flow of air from the drive motor of said turbine when the airplane is not actually switched on.

In another embodiment, the means for allowing or inhibiting the flow of air act on means capable of interrupting the propagation of the flow of air toward the airplane.

For example, a stop valve in the air circuit between the turbine producing the flow of air and the airplane is used to block the flow of air from propagating toward the airplane.

Advantageously, means upstream of the discharge of the flow of air in relation to the means of preventing the propagation of the flow of air are associated with this embodiment in order to limit the pressure in the air circuit when the flow of air toward the airplane is blocked.

The information S, which is characteristic of the fact that the airplane is actually switched on, is transmitted to means for allowing or inhibiting the flow of air toward the airplane by using at least one wire link, electric or optic, and/or at least one wireless link, radio or infrared.

Advantageously, the device in accordance with the invention comprises visual or acoustic means, associated with the means for allowing or inhibiting the flow of air, which emit signals characteristic of the fact that the airplane is or is not actually switched on.

In a particular embodiment of the invention, the means of electric production on the ground and the means of producing the flow of air are separated from each other and the means of detecting the state of the fact that the airplane is actually switched on comprise a current clamp capable of being placed on one of the conductors of the electric cable linking an electric power unit of the means of electric production to the airplane, said current clamp being connected via an electric link to means of inhibiting the flow of air, which are associated with the means of producing the flow of air. Said means of inhibition act so as to allow the flow of air toward the airplane when the current clamp measures a current strength I in one of the conductors of the electric cable that is greater than a predetermined threshold current strength I0.

The following description of an embodiment of the invention is given with reference to the following drawings:

FIG. 1: a general view, in operational position, of a device for supplying electricity and air to an airplane on the ground.

Figure 2:
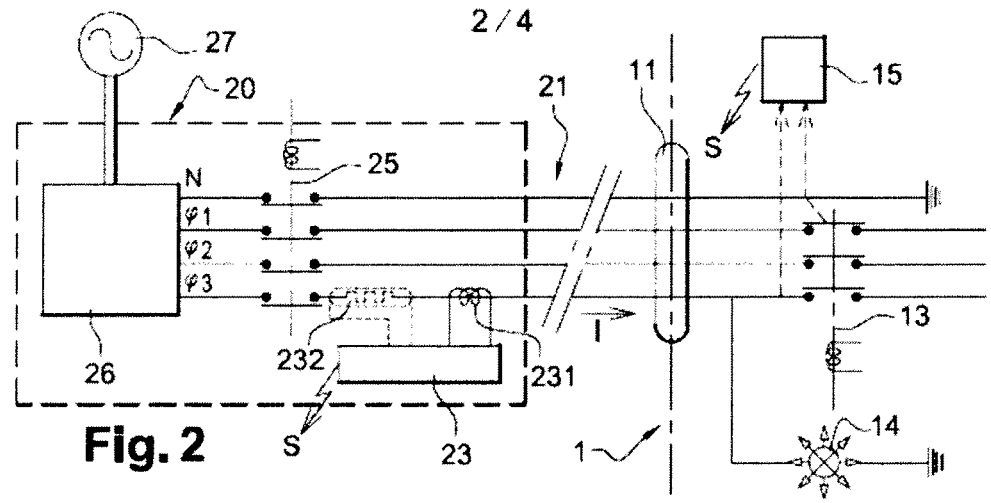

FIG. 2: the principle of detection of the fact that an airplane connected to an electric power source on the ground is actually switched on.

Figure 3:
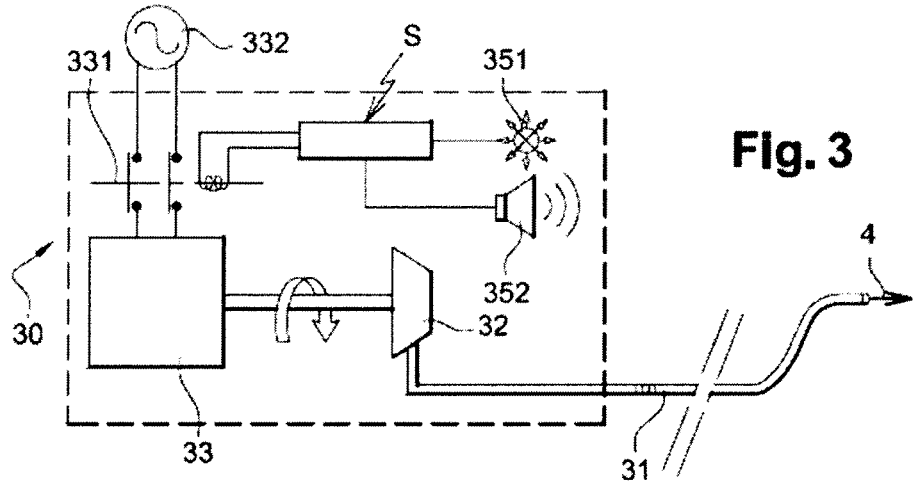

FIG. 3: the principle of inhibiting means of producing air by cutting off the supply of an electric drive motor.

Figure 4:
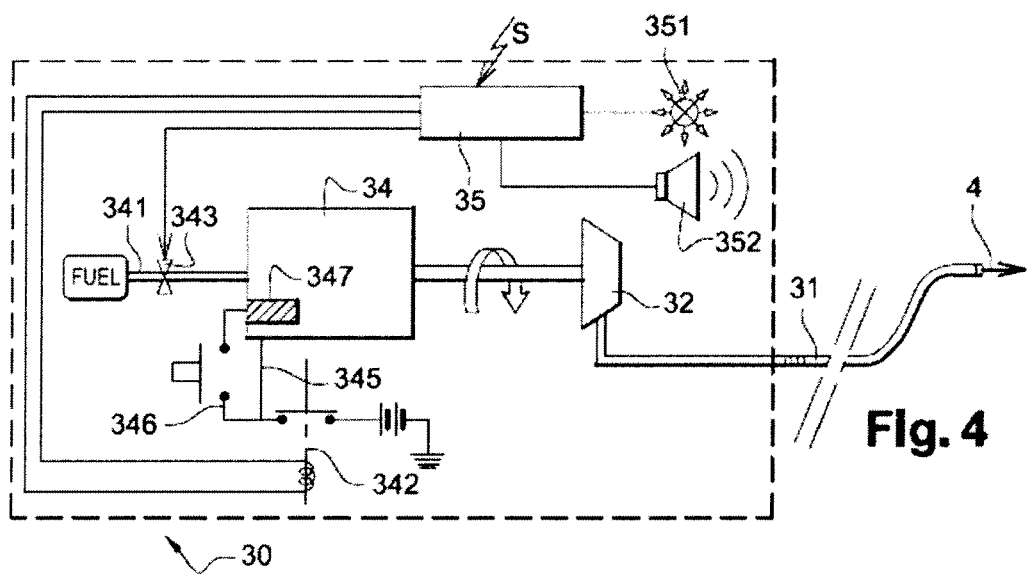

FIG. 4: the principle of inhibiting means of producing air by cutting off the supply of a Thermic drive engine.

Figure 5:
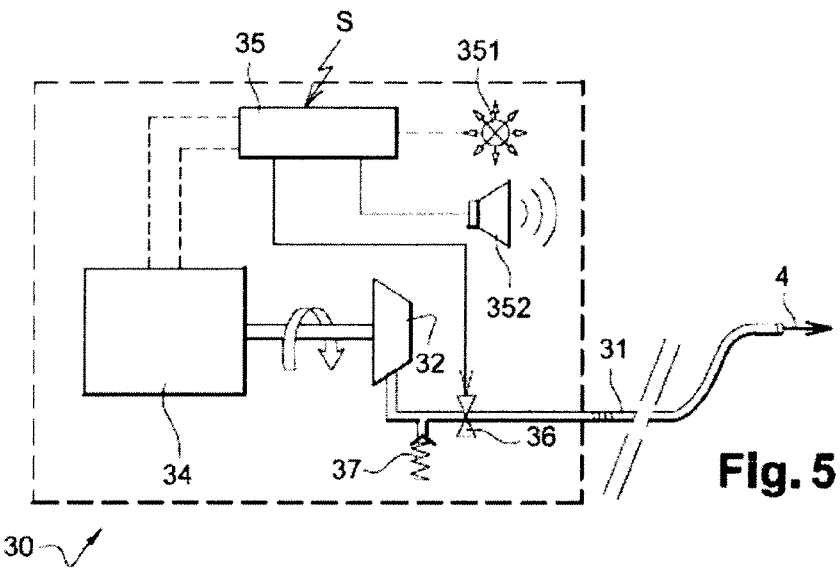

FIG. 5: the principle of inhibiting means of producing air by closing a valve in the circuit supplying air to the airplane.

Figure 6:
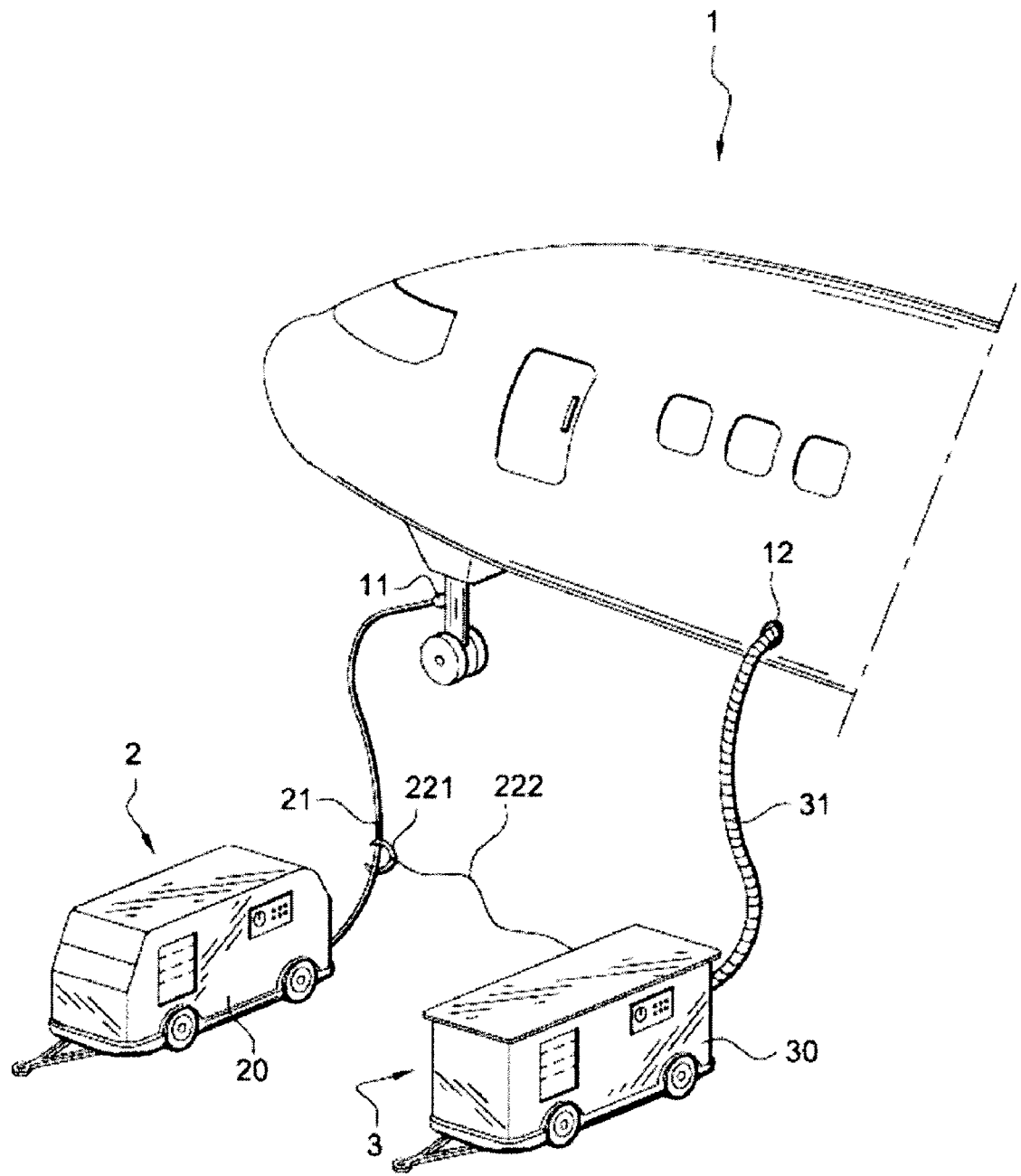

FIG. 6: a depiction of a particular embodiment in operational position.

Figure 7:
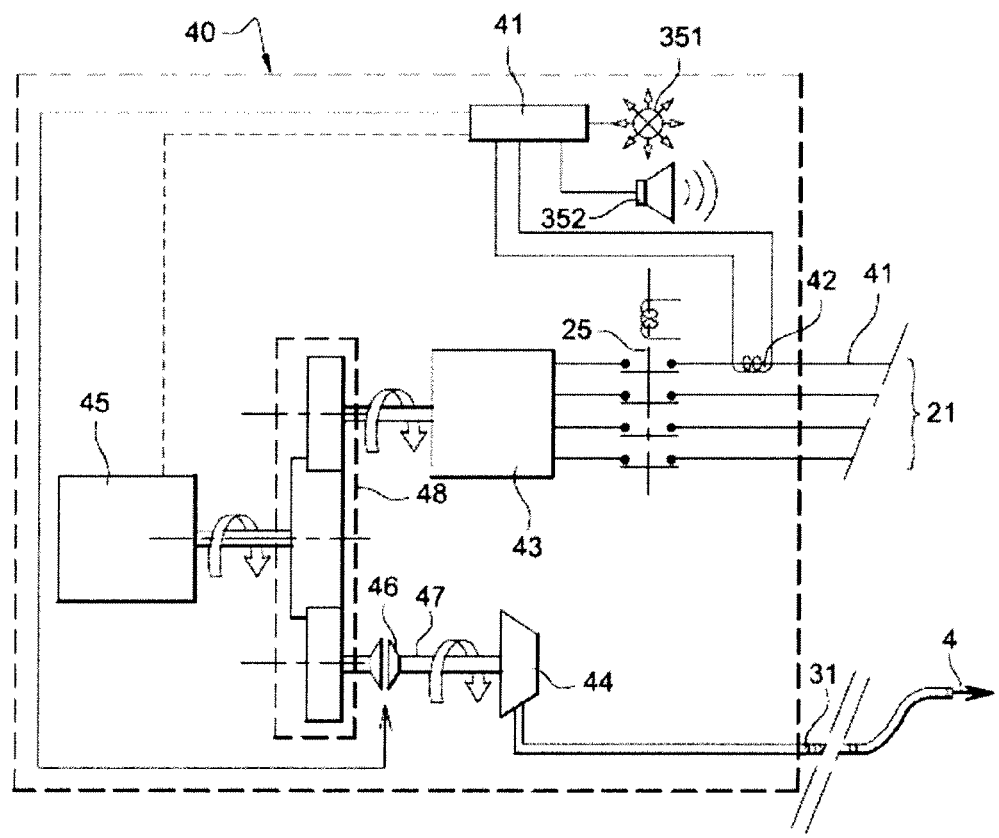

FIG. 7: the functional principle of a device whose means of electric production and whose means of producing a flow of air use a common drive source and whose means of inhibiting means of producing air use a clutch on the mechanical driving shaft of a turbine.

The device in accordance with the invention comprises means 2 for producing on the ground the electric power necessary for supplying electric energy to an airplane 1 during the operations that require this energy, when the engines and the autonomous means of producing electricity of the airplane are shut off, and means 3 for producing a flow of conditioned air intended for the cabin of the airplane 1, so as to ensure a ventilation and a satisfactory temperature during the maintenance operations and/or the boarding of passengers.

The means 2 of producing electric energy comprise at least one electric power unit 20, capable of ensuring an electric supply, that is, the voltages, frequencies, and currents, expected by the airplane 1. One power unit 20 consists, for example of a converter 26, such as a static converter or a rotating unit (generator driven by a motor), supplied with an electric energy available on the ordinary distribution network 27 of installations on the ground and providing an electric energy having the characteristics needed by the airplane. In another embodiment, the electric power unit 20 comprises a Thermic engine, which drives an electric generator, the characteristics of which correspond to the electric supply expected on the airplane. The at least one power unit 20 is connected to the airplane 1 via an electric cable 21, preferably by way of a ground service connector 11, provided for this purpose either on the fuselage or on a structure such as the landing gear, which is more readily accessible. Preferably, the conductors of the electric cable 21 are isolated from the converter 26 by means of a switch 25, which ensures the switching on of the ground service connector 11 on command. For airplanes of substantial size that resort to such means, the electric supply is most often accomplished by use of three-phase current, the standard most commonly used providing for the use of a alternating voltage of 115 volts at 400 hertz. In this case, the linking electric cable 21 comprises at least four conductors: three phases ($\phi 1$, $\phi 2$, $\phi 3$, and a neutral N. Even though the invention and, in particular, the figures are detailed in this particular example, it is readily understood that the invention is not limited to this sole type of electric supply.

The electric power unit 20 can be fixed in place or mobile and is installed at more or less a distance from the airplane 1, without any major inconvenience, because it is possible to use electric cables 21 of long length, which can be underground or else placed in technical platforms without any particular drawback.

The means 3 for producing the flow of conditioned air comprise an air-producing unit 30, physically associated with an electric power unit 20 or else dissociated from the latter, which is connected to the airplane 1, at the level of an opening 12 provided for this purpose, by way of a tube 31, the cross section of which is adapted to the rate of air flow necessary for conditioning the cabin. The air-producing unit 30 can be at a distance from the airplane, installed, for example, at a fixed position in a building, and, in this case, the air is carried to the airplane 1 or to each airplane concerned via the tubes 31 of relatively long length; preferably, however, the air-producing unit 30 is of a design that allows it to be brought into the proximity of the airplane 1 so as to be connected to it by a relatively short tube 31 in order to prevent load losses and to facilitate the manipulation of said tube. The air-producing unit 30 comprises means for producing a flow of air 4—for example, a turbine 32—and possibly means (not depicted) for refrigerating the air—for example, a refrigerating unit—and/or heating of the air. The turbine 32 and the other means of this air-producing unit 30 requiring mechanical power are driven by at least one electric motor 33, as in the embodiment of FIG.

3, which, then, is connected to an exterior electric power source 332 for its supply of energy, or by at least one Thermic engine motor 34, as in the embodiment of FIG. 4.

Means capable of detecting that the airplane is actually switched on electrically act on the air-producing means 30 in such a manner that the delivery of air into the tube 31, connected to the airplane, is inhibited when the airplane 1 is not actually electrically switched on and is allowed when the airplane 1 is actually switched on electrically.

The means of detecting that the airplane 1 is actually switched on electrically are ground means or means of the airplane that emit a signal characteristic of the state of the on/off switching that is in effect in the airplane 1.

In a preferred embodiment, these means are associated with the means 2 of producing electric energy on the ground. In this case, a measure of the effective electric load of said means gives the power and a value W characteristic of the power—for example, the electric current strength I taken up by the airplane 1, measured by means of a current transformer 231a and/or an electric shunt 231b—to the means 23 for manipulation and production of a state signal S. If the measured value W or its equivalent is greater than a threshold value W0, the state signal S is set at the value corresponding to the condition "PRESENT," which is characteristic of the fact that the airplane is actually switched on, and if it is less than or equal to the threshold value W0, the state signal S is set at a value corresponding to the condition "ABSENT," which is characteristic of the fact that the airplane is not actually switched on. The threshold value W0 is determined so as to be representative, without any ambiguity, of the fact that the airplane is or is not actually switched on. The value W0 is chosen as a value in between a value Wmin, which is characteristic of the maximum power taken up by the airplane 1, which is connected, but not actually switched on (this value is not equal to zero owing, for example, to certain technical lighting 14 or to a power-management computer, which are switched on once the ground service connector 11 is switched on when the switch 25 is closed), and a value Wmax, which is characteristic of the minimum power taken up by the airplane 1, which is actually switched on, that is, when the master switch 13 of the airplane 1 is closed and when few electric loads are switched on. For example, a value W0 equal to the mean value between the two values, or W0=(Wmin+Wmax)/2, is taken.

In another embodiment of the invention, the state signal S, characteristic of the actual switching on of the airplane, is generated by means of the airplane 1 itself. For example, means of the airplane 1, such as a computer 15 for electric-power-supply management or another dedicated means, determine whether the ground supply voltage is or is not present on the ground service connector 11 and whether the supply switches 13 are or are not activated. When the conditions that characterize the fact that the airplane 1 is actually switched on are combined, said means of the airplane 1 then generate a signal state S corresponding to the condition "PRESENT."

The signal state S, corresponding to the condition "PRESENT" or "ABSENT," is transmitted to the means 35, 36 of inhibiting the flow of air 4 delivered to the tube 31 connected to the airplane 1. Advantageously, the absence of a state signal is equivalent to the condition "ABSENT."

The state signal S can be transmitted from the means 2 of producing electric energy or from the airplane 1, as depicted in FIG. 1 and FIG. 2, to the means 3 of producing a flow of conditioned air via a wire link 211, 111 or via a wireless link 212, 112, such as a radio link or an infrared link.

In a preferred embodiment, particularly adapted to the case where the means 3 of producing the flow of conditioned air are means designed to be connected to a single airplane simultaneously, the means of inhibition 35, 36 comprise means capable of preventing the starting of the motor(s) 33, 34 of the air-producing unit 30 of said means of production 3 or of causing them to shut off. In the case of an air-producing unit 30 driven by an electric motor 33, as illustrated in FIG. 3, a switch 331, placed between the electric supply source 332 and the motor 33 receives the state signal S, amplified if necessary, so as to be in an open position if the state signal S corresponds to the condition "ABSENT," the supply of the motor 33 by the source 332 then being interrupted, and so as to be in a closed position if the state signal S corresponds to the condition "PRESENT," the motor 33 then being supplied. In a preferred embodiment, the switch 331 is in an open position at rest or the in absence of the state signal S so as to block the starting of the motor in the event of failure of the means allowing production of the state signal S. In the case of an air-producing unit 30 driven by a Thermic engine 34, as depicted in FIG. 4, the switch 342 obeys the same principle, being advantageously placed on the electric circuit 334 of the electric supply system 345 and electric starting system 346 of the Thermic engine 34, blocking the possibility of activating the starter 347 as long as the state signal S does not correspond to the condition "PRESENT."

In the particular case of an air-producing unit 30 that functions with a Thermic engine 34 without electric ignition in operation, particularly a motor of the diesel type, means 343 capable of stopping or allowing fuel supply to the motor 34 are advantageously provided in the fuel circuit 341. These means 343—for example, an electrically controlled stop valve—interrupt the supply of fuel when the state signal S corresponds to the condition "ABSENT," this having the effect not only of preventing the starting of the motor 34, but also of stopping said motor and thus the flow of air 4 to the air-supply tube 31 connected to the airplane 1 if the actual electric supply of the airplane is stopped prior to the stop of the air-producing means 30.

In another embodiment, the means of inhibition 35 act on a valve 36, which blocks the passage of air to the tube 31 linked to the airplane when the state signal S does not correspond to the condition "PRESENT." Such a valve consists, for example, of a movable flap, positioned in the air circuit and linked to an actuator that is able to position the flap in such a way that it allows the flow of air to pass when the state signal S corresponds to the condition "PRESENT" or stops the flow of air when said signal S corresponds to the condition "ABSENT." In a particular embodiment, the air, for the condition "ABSENT," is diverted so as to be expelled into the open air—for example, by means of an overpressure valve 37—and to prevent the unit from functioning without a flow rate.

Preferably, at least one lamp 351, indicating the value of the state signal S—for example, green for the condition "PRESENT" and red for the condition "ABSENT"—and/or a device for emitting audible signals 352 is associated with the air-producing means 30, which are near, for example, to a control and command panel for said means, so as to inform the operators of the electric situation of the airplane 1 or, if necessary, to signal to them a failure in the chain of measures and manipulations that generate the state signal S of the actual electric situation of the airplane 1.

In a particular embodiment of the invention, an example of which is presented in FIG. 6, the characteristic value W of the electric power used by the airplane 1 is determined by measuring the current strength I on one phase by means of a current transformer 221, such as a current clamp, placed on the cable 21 between the electric power unit 20 and the ground service connector 11. Said current transformer 221 is linked via a sufficiently long, flexible connection 222, which is several meters in practice, to the air-producing unit 30, which comprises, in addition to means of inhibition and of command of said means of inhibition, the logic means for determining the value of the signal state S. Owing to said extension cable 222, the operator easily places the current transformer 221 on one of the conductors, corresponding to one phase of the electric cable 21 that supplies the airplane 1. In this embodiment, it is possible to limit the modifications in relation to conventional systems to a single air-producing unit 30 and it is possible to implement the invention without modification of either the existing means of producing electric energy 2 or the airplane 1. Moreover, it is possible to transform the existing air-producing groups so as to make them conform to the invention.

In a related embodiment, which is not depicted, the current transformer 221, such as a current clamp, is fixed in place on the air-producing unit 30 in a cable guide in the form of a cradle capable of receiving a section of the electric cable that supplies the airplane 1. Arranged in this cradle is an area corresponding to the opening of the current transformer for receiving one of the conductors corresponding to one phase of the electric cable 21.

In another embodiment, a variant of which is depicted in FIG. 7, the electric power unit and the air-producing unit are replaced by a single assembly 40, which combines the two functions, and the sensor(s) 42 for measuring the actual electric load—for example, an electric shunt or a current clamp—and the means 41 for producing the state signal S. Said sensors 42 for measuring the actual electric load are positioned in a fixed manner on at least one phase 210 of the electric circuit 21 intended to supply the airplane. In this embodiment, when the means 43 of producing electric energy and the means 44 producing a flow of air use the same motor 45, which mechanically drives the two means of production and production 43, 44, by means, for example, of a gear device 48, the inhibition of the supply of air to the tube 31 connected to the airplane would be advantageously accomplished by means of a valve 36 according to the embodiment presented in FIG. 5 or by means of a clutch 46, as presented in FIG. 7. In this latter embodiment, which implements a clutch 46—for example, an electromagnetic clutch—said clutch 46 is capable of decoupling the means 44 of producing air from a shaft 47 driven by the motor 45 in response to a state signal S corresponding to the condition "ABSENT" and/or of preventing the coupling of said means 44 with the shaft 47 and/or or of coupling these means in response to a state signal S corresponding to the condition "PRESENT."

The invention claimed is:

1. A device for supplying electricity and air to an airplane on the ground, comprising
   an electric power supply unit connected to at least one electric circuit of the airplane to supply electric power to the airplane;
   a detector for sensing electric power being used by the airplane and generating a signal indicative thereof;
   an air producing unit connected to the airplane to provide conditioned air to the airplane; and
   wherein the air producing unit is activated to provide conditioned air when the signal of the detector indicates that power is being used by the airplane.

2. The device according to claim 1, wherein the detector measures a physical quantity W, which is characteristic of the electric power actually used by the airplane.

3. The device according to claim 2, wherein the airplane is regarded as being actually switched on when the characteristic measured physical quantity W of the electric power actually used by the airplane is greater than a predetermined threshold value W0.

4. The device according to claim 3, wherein the threshold value W0 is chosen between a minimum value, corresponding to the maximum electrical energy used by the airplane when it is not actually switched on, and a maximum value, corresponding to the minimum electrical energy used by the airplane when it is actually switched on.

5. The device according to claim 3, wherein the detector measures the current strength I between the electric power supply unit and the airplane on at least one electric conductor that establishes the electric link between the airplane and the electric power supply unit.

6. The device according to claim 5, wherein the detector comprises a current transformer for measuring the electric current strength I.

7. The device according to claim 5, wherein the detector comprises an electric shunt for measuring the electric current strength I.

8. The device according to claim 1, wherein the detector generates a state signal S, which has a value characteristic of the fact that the airplane is actually switched on when the airplane is determined to be actually switched on.

9. The device according to claim 1, wherein the detector generates a state signal S, which has a value indicating that the airplane is actually switched on when the airplane is determined to be actually switched on and which is emitted by the airplane.

10. The device according to claim 9, wherein the signal state S indicates that the airplane is actually switched on when the the electric power supply unit is detected as being switched on and an electric-power-supply master switch of the airplane is detected as being in closed position.

11. The device according to claim 1, wherein the air producing unit comprises a turbine and said turbine is activated in response to the signal from the detector indicating that the aircraft is using power.

12. The device according to claim 11, wherein the air producing unit comprises an electric drive motor, and wherein the electric supply of the motor is blocked when the airplane (1) is not actually switched on.

13. The device according to claim 11, wherein the air producing unit comprises a Thermic drive engine, and wherein an electric starting circuit for the thermic drive engine is blocked when the airplane is not actually switched on, to prevent the starting of the Thermic engine.

14. The device according to claim 11, wherein the the air producing unit comprises a Thermic drive engine, and wherein electric ignition circuits for the thermic drive engine are blocked when the airplane is not actually switched on, in such a manner that the Thermic engine motor is either stopped or kept shut off.

15. The device according to claim 11, wherein the air producing unit comprises a Thermic drive engine, and wherein fuel-supply circuits to the thermic drive engine comprise means capable of interrupting the delivery of fuel to the thermic drive engine, when the airplane is not actually switched on, in such a manner that the Thermic engine is either stopped or kept shut off.

16. The device according to claim 12, wherein the electric drive motor is coupled to a turbine by way of a clutch , which disconnects said turbine from said motor when the airplane is not actually switched on.

17. The device according to claim 1, further comprising means for preventing the propagation of the flow of air from the air producing unit to the airplane in response to the signal from the detector indicating that the airplane is not turned on.

18. The device according to claim 17, wherein the means for preventing the propagation of the flow of air to the airplane comprises a stop valve in an air circuit between the turbine for producing the flow of air and the airplane.

19. The device according to claim 17, further comprising means for limiting the pressure in the air circuit disposed upstream of the discharge of the flow of air from the means capable of preventing the propagation of the flow of air.

20. The device according to claim 1, wherein a parameter S, which is characteristic of the fact that the airplane is actually switched on, is transmitted to the air producing unit by using at least one electrical or optical link.

21. The device according to claim 1, wherein a parameter S, which is characteristic of the fact that the airplane (1) is actually switched on, is transmitted to the air producing unit by using at least one wireless, radio or infrared link.

22. The device according to claim 1, wherein illuminated means or audible means associated with the air producing unit emit signals indicating that the airplane is or is not actually switched on.

23. The device according to claim 1, wherein the electric power supply unit and the air producing unit are separated from each other and the detector comprises a current clamp coupled to at least one conductors of an electric cable linking the electric power supply unit to the airplane (1), said current clamp being connected by an electric link to means for inhibiting the flow of air, which are associated with the air producing unit.

24. The device according to claim 23, wherein the means for inhibiting the air flow act so as to allow the flow of air to the airplane when the current clamp senses a current that is greater than a predetermined threshold current.

* * * * *

UNITED STATES PATENT AND TRADEMARK OFFICE
CERTIFICATE OF CORRECTION

| | | |
|---|---|---|
| PATENT NO. | : 7,651,052 B2 | Page 1 of 1 |
| APPLICATION NO. | : 11/672998 | |
| DATED | : January 26, 2010 | |
| INVENTOR(S) | : M. Pierre Delort | |

It is certified that error appears in the above-identified patent and that said Letters Patent is hereby corrected as shown below:

Column 8, line 34, delete "the the" and insert --the-- therefor.

Column 8, line 51, delete "the the" and insert --the-- therefor.

Signed and Sealed this

Twenty-fourth Day of August, 2010

David J. Kappos
*Director of the United States Patent and Trademark Office*